(12) United States Patent
Hattori et al.

(10) Patent No.: US 6,475,593 B1
(45) Date of Patent: Nov. 5, 2002

(54) FLOOR MAT

(75) Inventors: Kenji Hattori, Nara; Hitoshi Matsuyama, Ikoma, both of (JP)

(73) Assignee: Eidai Kako Co., Ltd., Osaka (JP)

( * ) Notice: Subject to any disclaimer, the term of this patent is extended or adjusted under 35 U.S.C. 154(b) by 79 days.

(21) Appl. No.: 09/669,715

(22) Filed: Sep. 26, 2000

(30) Foreign Application Priority Data

Feb. 3, 2000 (JP) ........................................ 2000-026577

(51) Int. Cl.[7] .................................................. B32B 3/06
(52) U.S. Cl. ............................. 428/95; 428/99; 428/120
(58) Field of Search .......................... 428/99, 95, 120; 296/97.23; 15/217, 215

(56) References Cited

U.S. PATENT DOCUMENTS 4,399,176 A * 8/1983 Bell et al. ...................... 428/85
5,389,176 A * 2/1995 Nakanishi et al. ........... 156/242

FOREIGN PATENT DOCUMENTS

| JP | 3-026350 | 4/1996 |
| JP | 03-026350 | 4/1996 |
| JP | 3-031429 | 9/1996 |
| JP | 03-031429 | 9/1996 |

* cited by examiner

*Primary Examiner*—Alexander S. Thomas
(74) *Attorney, Agent, or Firm*—Armstrong, Westerman & Hattori, LLP

(57) ABSTRACT

A floor mat includes a mat main body and a plurality of slip-prevention members integrally provided on a rear surface of the mat main body at certain intervals. Each of the slip-prevention members includes a plate-shaped base portion having a lower end surface and a plurality of leg portions integrally protruding from the lower end surface so as to be perpendicular thereto. It is preferable that the mat main body and the slip-prevention members are made of thermoplastic elastomer having a hardness of 65 to 80, the mat main body is provided with 36 to 98 pieces of the slip-prevention members per 10 square centimeters (10 cm$^2$), each of the plate-shaped base portions is set to have a thickness of 0.5 to 1.5 mm and a lower surface area of 7 to 30 square millimeters (mm$^2$), each of the leg portions is set to 0.7 to 1.5 mm in height and 0.7 to 1.5 mm in diameter, and each of the plate-shaped base portions is provided with 2 to 8 pieces of the columnar leg portions.

18 Claims, 4 Drawing Sheets

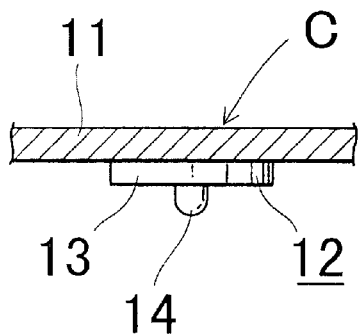
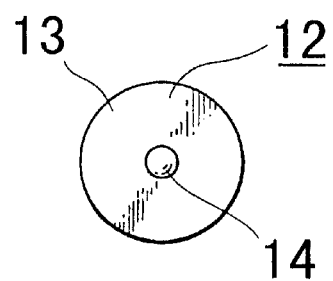
FIG. 5A (RELATED ART)
FIG. 5B (RELATED ART)
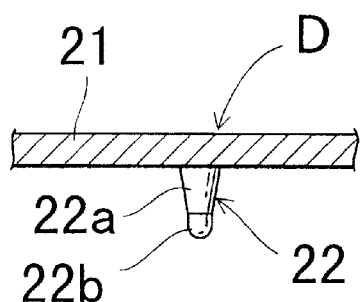
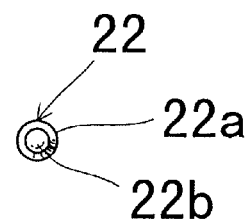
FIG. 6A (RELATED ART)
FIG. 6B (RELATED ART)

FLOOR MAT

BACKGROUND OF THE INVENTION

1. Field of the Invention

The present invention relates to a floor mat, and more particularly, to a floor mat preferably used as an automobile floor mat to be disposed on an automobile floor carpet.

2. Description of Related Art

As a conventional floor mat of this kind, a resin molded floor mat or a composed floor mat are known. The resin molded floor mat is a molded article made of soft synthetic resin, and the composed floor mat is a laminated article including a surface carpet layer made of synthetic fibers such as polyester fibers or polypropylene fibers and a backing layer made of soft synthetic resin integrally provided on the rear surface of the surface carpet layer. In the aforementioned conventional floor mats, various slip-prevention members have been proposed in order to improve the slip-prevention effect against a floor carpet on which the floor mat is to be disposed.

One example of such a slip-prevention member is disclosed by Japanese Utility Model Registration No. 3,026, 350. The slip-prevention member comprises a plate-shaped base portion protruding from a rear surface of a mat main body and a plurality of small protrusions protruding radially outwardly from the peripheral edge portion of the lower end surface of the plate-shaped base portion.

Another example of such a slip-prevention member is disclosed by Japanese Utility Model Registration No. 3,031, 429. The slip-prevention member comprises a conical basal portion and a columnar tip portion integrally downwardly protruding from the lower end of the conical basal portion.

According to these proposed slip-prevention members, an enhanced slip-prevention effect can be actually obtained as compared to a conventional conical-shaped slip-prevention member.

However, in the slip-prevention member disclosed by Japanese Utility Model Registration No. 3,026,350, it is very difficult to form such small protrusions protruding radially outwardly from the peripheral edge portion of the lower end surface of the plate-shaped base portion.

On the other hand, in the slip-prevention member disclosed by Japanese Utility Model Registration No. 3,031, 429, if the number of the columnar tip portions is increased in order to enhance the slip-prevention effect, the number of the conical basal portions should also be increased, resulting in an increased amount of materials forming the floor mat, which in turn causes an increased weight and an increased manufacturing cost.

SUMMARY OF THE INVENTION

In view of the aforementioned technical backgrounds, it is an object of the present invention to provide a floor mat which can be easily manufactured and is light in weight and excellent in slip-prevention effect.

According to a first aspect of the present invention, a floor mat includes a mat main body and a plurality of slip-prevention members integrally provided on a rear surface of the mat main body at certain intervals. Each of the slip-prevention members includes a plate-shaped base portion having a lower end surface and a plurality of leg portions integrally protruding from the lower end surface so as to be perpendicular thereto.

According to a second aspect of the present invention, a floor mat includes a surface carpet layer and a backing layer integrally provided on a rear surface of the surface carpet layer. The backing layer includes a main body and a plurality of slip-prevention members integrally provided on a rear surface of the main body at certain intervals. Each of the slip-prevention members includes a plate-shaped base portion having a lower end surface and a plurality of leg portions integrally protruding from the lower end surface so as to be perpendicular thereto.

With the aforementioned floor mats, even in a state that no load is applied onto the floor mat disposed on a floor carpet, or nothing is placed on the floor mat, the floor mat can show an excellent slip-prevention effect against the floor carpet because the leg portions are caught by the carpet layer of the floor carpet. Furthermore, in a state that a load is applied onto the floor mat disposed on a floor carpet, for example, something is placed on the floor mat, the floor mat can show a further enhanced slip-prevention effect against the floor carpet because, in addition to the leg portions, the plate-shaped base portions are also caught by the carpet layer of the floor carpet. In addition, since the leg portions protrude from the lower end surface of the plate-shaped base portion so as to be perpendicular thereto, the molding of the floor mat can be performed easily.

In each of the aforementioned floor mats, it is preferable that the slip-prevention members are made of thermoplastic elastomer having a hardness of 65 to 80, the number of the slip-prevention members is 36 to 98 per 10 square centimeters (10 cm$^2$), each of the plate-shaped base portions has a thickness of 0.5 to 1.5 mm and an area of the lower end surface is 7 to 30 square millimeters (mm$^2$), each of the leg portions is 0.7 to 1.5 mm in height and 0.7 to 1.5 mm in diameter, and each of the plate-shaped base portions is provided with 2 to 8 pieces of the leg portions.

In the present specification, "hardness" denotes a hardness measured in accordance with the spring-type hardness test (Type A) according to the JIS (Japanese Industrial Standard) K6301, 5.2.

BRIEF DESCRIPTION OF THE DRAWINGS

The present invention will be more fully described and better understood from the following description, taken with the appended drawings, in which:

FIG. 5A is a cross-sectional view of a first comparative test piece No. 1 subjected to a sliding friction comparative test;

FIG. 5B is a bottom view of the slip-prevention member of the first comparative test piece No. 1;

FIG. 6A is a cross-sectional view of a second comparative test piece No. 2 subjected to a sliding friction comparative test; and FIG. 6B is a bottom view of the slip-prevention member of the second comparative test piece No. 2.

DETAILED DESCRIPTION OF THE PREFERRED EMBODIMENT

Preferred embodiments of the present invention will now be described with referenced to the accompanying drawings.

Figure 1:
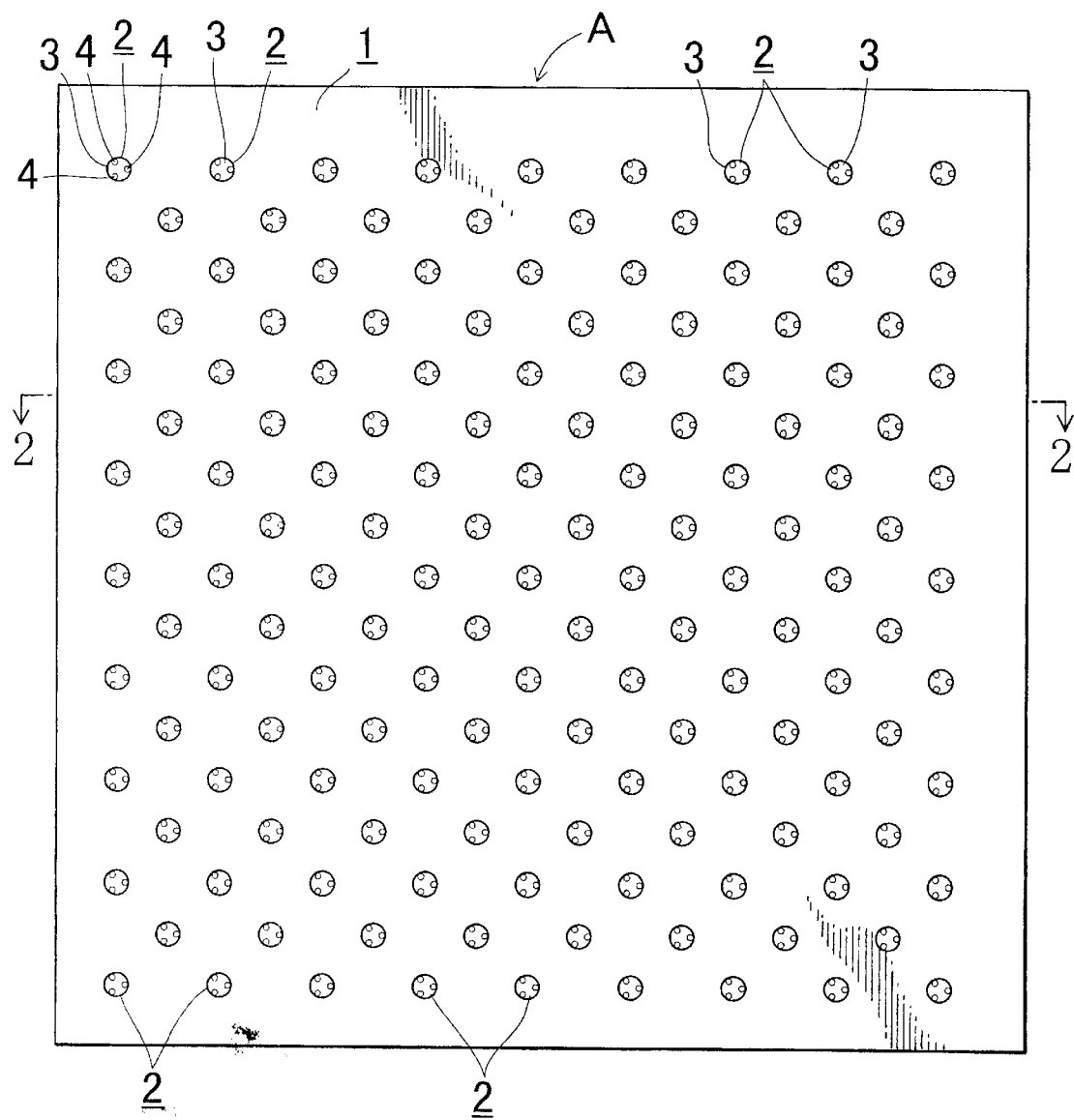
FIG. 1 shows a rear surface of an automobile floor mat according to a first embodiment of the present invention.
Figure 2A:
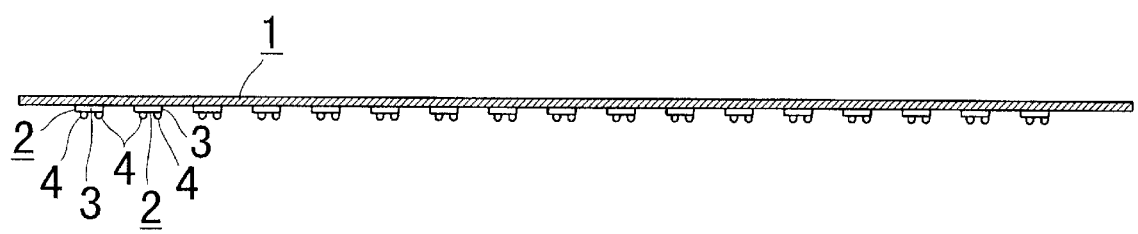
FIG. 2A is a cross-sectional view taken along the line 2—2 in FIG. 1.
Figure 2B:
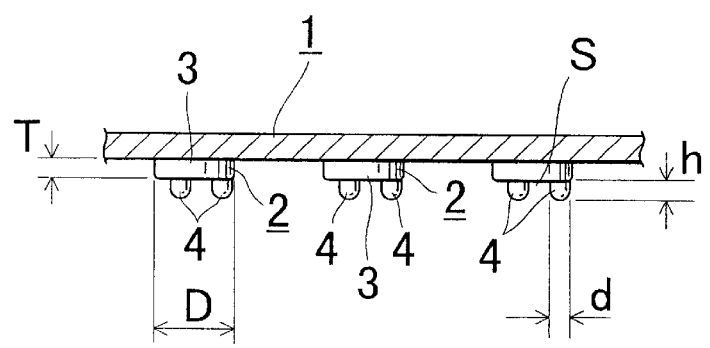
FIG. 2B is an enlarged partial cross-sectional view of the floor mat.
Figure 3:
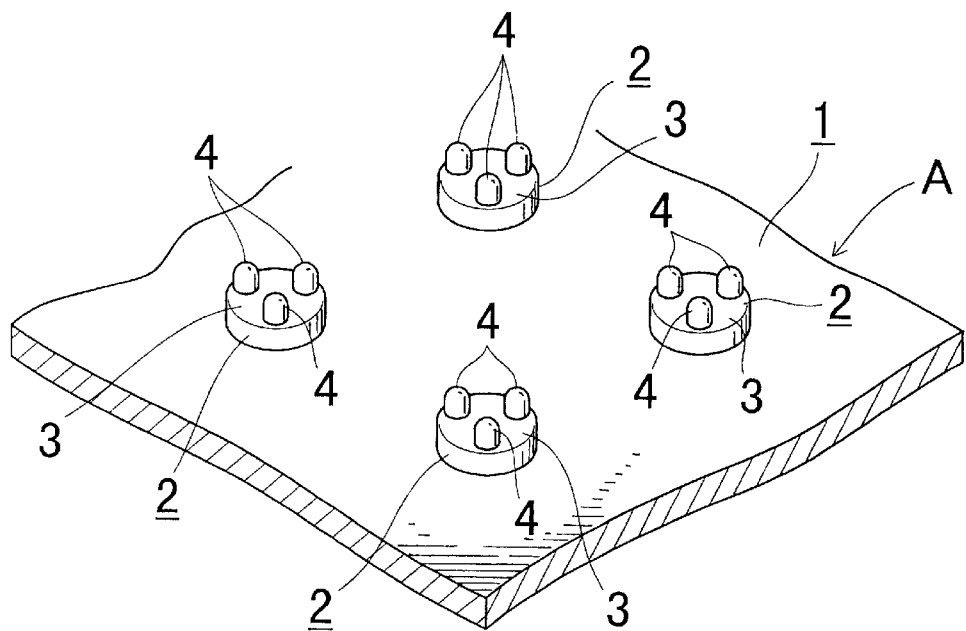
FIG. 3 is an enlarged partial perspective view showing the rear surface of the floor mat.

FIGS. 1 to 3 shows a floor mat A preferably used as an automobile floor mat according to a first embodiment of the present invention.

The floor mat A comprises a mat main body 1 and a plurality of slip-prevention members 2 integrally provided on the rear surface of the mat main body 1 at certain intervals.

The mat main body 1 is made of styrene elastomer having a hardness of 72, and has a thickness of 1.3 mm.

Preferably, the rear surface of the mat main body 1 except for the area from which the slip-prevention members 2 protrudes is formed to be uneven or rough so as to improve the slip-prevention effect.

The slip-prevention member 2 includes a circular plate-shaped base portion 3 and three columnar leg portions 4 integrally protruding from the lower end surface of the base portion 3 so as to be perpendicular thereto.

The plate-shaped base portion 3 has a diameter D of 4 mm and a thickness T of 1 mm. On the other hand, each of the columnar leg portions 4 protruding from the base portion 3 has a diameter d of 1 mm and a height h of 1 mm. The lower tip end of the leg portion 4 is formed as a convergent cusp-shaped member having a hemispherical end shape.

As shown in FIG. 1, the aforementioned slip-prevention members 2 are disposed on generally the whole area of the rear surface of the mat main body 1 in a scattered manner at the rate of 72 pieces per 10 square centimeters (10 cm$^2$). As a result, the mat main body 1 is provided with downwardly protruding columnar leg portions 4 at the rate of 216 pieces per 10 square centimeters (cm$^2$).

However, the floor mat A according to the present invention is not limited to the aforementioned embodiment. It is preferable that the mat main body 1 and the slip-prevention members 2 are formed of rubber or thermoplastic elastomer. If the hardness is less than 65, the columnar leg portion 4 becomes too soft to be caught firmly by the floor carpet on which the floor mat A is disposed. On the other hand, if the hardness exceeds 80, the mat main body 1 becomes too hard to fit on a floor carpet disposed on a curved surface of an automobile floor. As a result, it becomes difficult to obtain an excellent slip-prevention effect. Accordingly, it is preferable that the hardness falls within the range of from 65 to 80.

Although the optimal number of the slip-prevention members 2 may differ depending on the shape and/or the size of the plate-shaped base portion 3 and the columnar leg portion 4, it is preferable that the slip-prevention members 2 are formed at a rate of 36 to 98 pieces per 10 square centimeters (10 cm$^2$). If the number of the slip-prevention members 2 per 10 square centimeters (10 cm$^2$) becomes less than 36, the contact area between the columnar leg portions 4 and the floor carpet become insufficient, resulting in an unsatisfactory slip-prevention effect. On the other hand, if it exceeds 98, the amount of materials increases, resulting in an increased cost of materials and an increased cost for manufacturing the molding dies. This makes it difficult to provide a low-priced floor mat A.

Furthermore, it is preferable that the thickness T of the plate-shaped base portion 3 is 0.5 to 1.5 mm and the area S of the lower end surface thereof is 7 to 30 square millimeters (mm$^2$). The base portion 3 is also expected to generate an engaging effect between the base portion 3 and a floor carpet. If the thickness T is less than 0.5 mm, the expected engaging effect cannot be obtained. On the other hand, if the thickness T exceeds 1.5 mm and/or the area S of the lower end surface of the base portion 3 exceeds 30 square millimeters (mm$^2$), the amount of materials increases, which results in an increased cost of materials, an increased weight of the floor mat A and a decreased engaging effect by the base portion 3. If the area S is less than 7 square millimeters (mm$^2$), it becomes difficult to form a plurality of columnar leg portions 4 having a below mentioned desired size.

Furthermore, although the configuration of the base portion 3 is not specifically limited, taking account of manufacturing the molding dies, it is preferable that the base portion 3 is formed to have, for example, a circular shape or a polygonal shape such as a square shape and an equilateral triangular shape when seen from the above.

Preferably, the columnar leg portion 4 is formed into a columnar shape having a circular cross-section and has a height h of 0.7 to 1.5 mm and a diameter d of 0.7 to 1.5 mm. The columnar leg portion 4 contacts a floor carpet in a state that the leg portion 4 protrudes from the lower end surface of the base portion 3 so as to be perpendicular thereto. This causes the leg portion 4 to be engaged with the floor carpet, resulting in an excellent slip-prevention effect. However, if the height h exceeds 1.5 mm and/or the diameter d is less than 0.7 mm, the leg portion 4 may become excessively deformative, causing a failure of an engagement with the floor carpet, which results in an insufficient slip-prevention effect. On the other hand, if the height h is less than 0.7 mm and/or the diameter d exceeds 1.5 mm, although the leg portion 4 hardly deforms, an engagement of the leg portion 4 with the floor carpet deteriorates.

In the present invention, it should be understood that the configuration of the leg portion 4 is not limited to the aforementioned embodiment, which is circular in cross-section and has a constant diameter along its length except for the tip end portion. The leg portion 4 may have a polygonal cross-section, or may have a cross-section gradually decreasing toward its tip end portion. Furthermore, the configuration of the tip end portion of the leg portion 4 is not limited to a semispherical shape, but may be, for example, a flat shape or a sharp-pointed shape. In other words, the leg portion 4 may be of any desired configurations as long as it is possible to obtain a so-called spike effect, i.e., an engaging effect with a floor carpet disposed on a floor.

Furthermore, it is preferable to form two to eight leg portions 4 on each plate-shaped base portion 3 because of the following reasons. If only one leg portion 4 is formed on the base portion 3, it is not enough to obtain a desired slip-prevention effect. On the other hand, if more than 8 leg portions 4 are formed on the base portion 3, the cost for manufacturing the molding dies increases, which makes it difficult to provide a low-priced floor mat.

Figure 4:
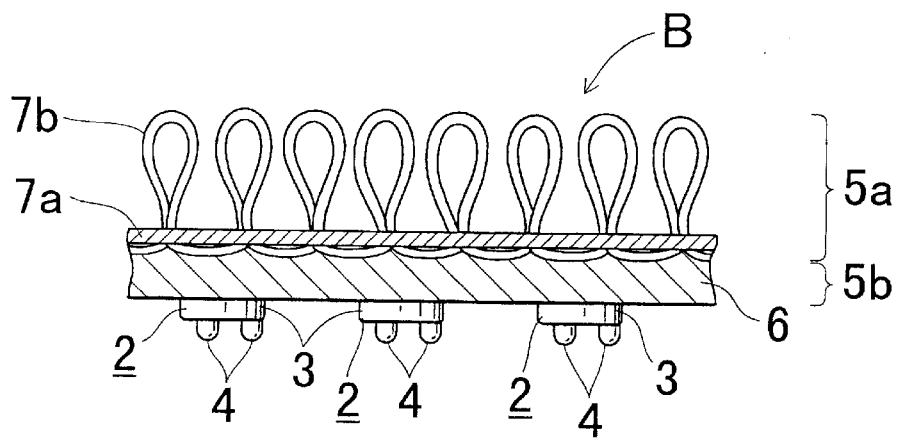
FIG. 4 is an enlarged partial cross-sectional view of an automobile floor mat according to a second embodiment of the present invention.

FIG. 4 is a partially enlarged cross-sectional view preferably used as an automobile floor mat according to a second embodiment of the present invention.

This floor mat B comprises a surface carpet layer 5a and a backing layer 5b integrally provided on the rear surface of the surface carpet layer 5a.

The surface carpet layer 5a includes a sheet member 7a and loop-shaped pile 7b whose ends are embedded in the sheet member 7a.

The backing layer 5b includes a sheet-shaped main body 6 and a plurality of slip-prevention members 2 integrally provided on the rear surface of the main body 6 at certain intervals. This slip-prevention member 2 of this embodiment comprises a plate-shaped base portion 3 and a plurality of columnar leg portions 4 integrally provided on the lower end surface of the base portion 3 so as to be perpendicular thereto. Since this slip-prevention member 2 is the same as the slip-prevention member of the first embodiment, the detailed explanation will be omitted.

An A4-size inventive test piece according to the present invention is prepared by cutting out the automobile floor mat A of the aforementioned first embodiment, and is subjected to a slip test to measure the maximum load required to slide the test piece disposed on a floor carpet. On the other hand, an A4-size first comparative test piece No. 1 denoted as C in FIG. 5A, and the same size second comparative test piece No. 2 denoted as D in FIG. 6A are also prepared by cutting the automobile floor mat having the slip-prevention member 12 shown in FIGS. 5A and 5B and the automobile floor mat having the slip-prevention member 22 shown in FIGS. 6A and 6B, respectively, and are subjected to a slip test to measure the maximum load required to slide each test piece disposed on the aforementioned floor carpet. The measured results are shown in Table 1.

The aforementioned first comparative test piece No. 1 (C) includes a mat main body 11, which has a thickness of 1.3 mm and is made of a styrene elastomer having a hardness of 72, and a number of slip-prevention members 12 provided on the rear surface of the mat main body 11, likewise the automobile floor mat A of the first embodiment. The slip-prevention member 12 comprises a plate-shaped base portion 13 having a thickness of 1 mm and a diameter of 4 mm and a single columnar leg portion 14 having a height of 1 mm and a diameter of 1 mm. The leg portion 14 has a hemispherical tip end portion. The mat main body 11 is provided with 72 pieces of the aforementioned slip-prevention members 12 per 10 square centimeters (10 cm$^2$) on the rear surface of the mat main body 11.

On the other hand, the aforementioned second comparative test piece No. 2 (D) includes a mat main body 21, which has a thickness of 1.3 mm and is made of a styrene elastomer having a hardness of 72, and a number of slip-prevention members 22 provided on the rear surface of the mat main body 21, likewise the automobile floor mat A of the first embodiment. The slip-prevention member 22 includes a conical base portion 22a and a hemispherical tip end portion 22b downwardly protruding from the lower end of conical base portion 22a. The total height of the slip-prevention member 22 is set to 2.7 mm, the diameter of the basal end of the conical base portion 22a is set to 1.3 mm, the diameter of the tip end of the conical base portion 22a and that of the hemispherical tip end portion 22b are set to 0.7 mm, respectively. The mat main body 21 is also provided with 72 pieces of the aforementioned slip-prevention members 22 per 10 square centimeters (10 cm$^2$) on the rear surface of the mat main body 21.

The measuring method will be explained as follows. A grommet (not shown) was fixed to the short side of each of the inventive test piece and the comparative test pieces. Then, each of the test pieces was disposed on an automobile floor carpet, and pulled by a push/pull scale (not shown) connected to the grommet in the longitudinal direction of the test piece. On each test piece, the tests were conducted to measure the maximum load required to slide the test piece on the floor mat under the two conditions, no load was applied onto the test piece and a 5-kg load was applied onto the test piece.

TABLE 1

|  | Maximum load (kgf) | |
| --- | --- | --- |
|  | No load | 5 kg-load |
| Inventive test piece | 2.5 | 18.0 |
| First comparative test piece | 1.5 | 12.0 |
| Second comparative test piece | 2.5 | 15.0 |

As will be understood from the measured results shown in table 1, the inventive test piece, i.e., the floor mat according to the present invention, shows sliding friction 1.5 to 1.6 times higher than that of the first comparative test piece No. 1 under either condition of no load and a 5-kg load. Although there is no difference between the inventive test piece and the second comparative test piece No. 2 under the condition of no load, the inventive test piece, i.e., the floor mat according to the present invention, shows higher sliding friction than that of the second comparative test piece No. 2 under the condition of 5-kg load. The reason is considered as follows. The plate-shaped base portion of the present invention does not positively takes a slip-prevention effect under the condition of no load. However, under the condition of 5-kg load, the base portion is caught by a carpet layer of the floor carpet, resulting in increased friction.

According to a first aspect of the present invention, a floor mat includes a mat main body and a plurality of slip-prevention members integrally provided on a rear surface of the mat main body at certain intervals. Each of the slip-prevention members includes a plate-shaped base portion having a lower end surface and a plurality of leg portions integrally protruding from the lower end surface so as to be perpendicular thereto.

According to a second aspect of the present invention, a floor mat includes a surface carpet layer and a backing layer integrally provided on a rear surface of the surface carpet layer. The backing layer includes a main body and a plurality of slip-prevention members integrally provided on a rear surface of the main body at certain intervals. Each of the slip-prevention members includes a plate-shaped base portion having a lower end surface and a plurality of leg portions integrally protruding from the lower end surface so as to be perpendicular thereto.

Accordingly, even in a state that no load is applied onto the floor mat disposed on a floor carpet, or nothing is placed on the floor mat, the floor mat can show an excellent slip-prevention effect against the floor carpet because the leg portions 4 are caught by the carpet layer of the floor carpet. Furthermore, in a state that a load is applied onto the floor mat disposed on a floor carpet, for example, something is placed on the floor mat, the floor mat can show further enhanced slip-prevention effect against the floor carpet because, in addition to the leg portions, the plate-shaped base portions are also caught by the carpet layer of the floor carpet.

In the present invention, in cases where the mat main body 1 or the backing layer 5b is made of thermoplastic elastomer having a hardness of 65 to 80, it is possible to provide a floor mat which is easy to manufacture and excellent in mechanical strength.

Furthermore, in cases where the number of the slip-prevention members 2 is set to 36 to 98 pieces per 10 square centimeters (10 cm$^2$), each of the plate-shaped base portions 3 is set to have a thickness of 0.5 to 1.5 mm and a lower end surface area of 7 to 30 square millimeters (mm$^2$), each of the leg portions is set to 0.7 to 1.5 mm in height and 0.7 to 1.5 mm in diameter and each of the plate-shaped base portions is provided with 2 to 8 pieces of the leg portions, it is possible to further enhance the slip-prevention effect while preventing an increase of the whole weight.

The floor mat according to the present invention is not limited to an automobile floor mat, but may also be used as a floor mat to be disposed on various floor carpet, or the like, disposed or fixed on a floor in a house.

It should be recognized that the terms and expressions used here are used for explanation and are not used for definitely interrupting, any equivalents of features shown and described here should not be precluded, and various modifications within the scope of claimed invention are allowed.

This application claims priority to Japanese Patent Application No. 2000-26577 filed on Feb. 3, 2000, the disclosure of which is incorporated by reference in its entirety.

What is claimed is:

1. A floor mat, comprising:

a mat main body; and a plurality of separate slip-prevention members integrally provided on a rear surface of said mat main body at certain intervals, wherein each of said slip-prevention members includes a plate-shaped base portion having a lower end surface, each said slip prevention member further having a plurality of leg portions each having a generally convergent tip integrally protruding at laterally spaced locations about said base portion from said lower end surface so as to be perpendicular thereto.

2. The floor mat as recited in claim 1, wherein said mat main body and said slip-prevention members are made of rubber having a hardness of 65 to 80.

3. The floor mat as recited in claim 2, wherein said mat main body is provided with 36 to 98 members per 10 square centimeters (10 $cm^2$), wherein each of said plate-shaped base portions is set to have a thickness of 0.5 to 1.5 mm and a lower surface area of 7 to 30 square millimeters ($mm^2$), and wherein each of said leg portions is set to 0.7 to 1.5 mm in height and 0.7 to 1.5 mm in diameter, and wherein each of said plate-shaped base portion is provided with 2 to 8 separate leg portions.

4. The floor mat as recited in claim 1, wherein said mat main body and said slip-prevention members are made of thermoplastic elastomer having a hardness of 65 to 80.

5. The floor mat as recited in claim 4, wherein said mat main body and said slip-prevention members are made of thermoplastic elastomer having a hardness of 65 to 80, wherein said mat main body is provided with 36 to 98 slip-prevention members per 10 square centimeters (10 $cm^2$), wherein each of said plate-shaped base portions is set to have a thickness of 0.5 to 1.5 mm and lower surface area of 7 to 30 square millimeters ($mm^2$), wherein each of said leg portions is set to 0.7 to 1.5 mm in height and 0.7 to 1.5 mm in diameter, and wherein each said plate-shaped base portions is provided with 2 to 8 separate leg portions.

6. The floor mat as recited in claim 1, wherein said mat main body is provided with 36 to 98 pieces of said slip-prevention members per 10 square centimeters (10 $cm^2$).

7. The floor mat as recited in claim 6, wherein each of said plate-shaped base is provided with 2 to 8 separate leg portions.

8. The floor mat as recited in claim 7, wherein each of said plate-shaped base portions is set to have a thickness of 0.5 to 1.5 mm and a lower surface area of 7 to 30 square millimeters ($mm^2$), and wherein each of said leg portions is set to 0.7 to 1.5 mm in height and 0.7 to 1.5 mm in diameter.

9. The floor mat as recited in claim 1, wherein each of said plate-shaped base portions is set to have a thickness of 0.5 to 1.5 mm and a lower surface area of 7 to 30 square millimeters ($mm^2$), and wherein each of said leg portions is set to 0.7 to 1.5 mm in height and 0.7 to 1.5 mm in diameter.

10. A floor mat, comprising:

a surface carpet layer; and a backing layer integrally provided on a rear surface of said carpet layer, wherein said backing layer includes a main body portion and a plurality of separate slip-prevention members integrally provided on a back surface of said main body at certain intervals, wherein each of said slip-prevention includes a plate-shaped base portion having a lower end surface and, each said slip prevention member further having a plurality of leg portions each having a generally convergent tip integrally protruding at laterally spaced locations about said base portion from said lower end surface so as to be perpendicular thereto.

11. The floor mat as recited in claim 10, wherein said backing layer is made of rubber having a hardness of 65 to 80.

12. The floor mat as recited in claim 11, wherein said main body is provided with 36 to 98 pieces of said slip-prevention members per 10 square centimeters (10 $cm^2$), wherein each of said plate-shaped base portions is set to have a thickness of 0.5 to 1.5 mm and a lower end surface area of 7 to 30 square millimeters ($mm^2$), and wherein each of said leg portions is set to 0.7 to 1.5 mm in height and 0.7 to 1.5 mm in diameter, and wherein said plate-shaped base portion is provided with 2 to 8 separate leg portions.

13. The floor mat as recited in claim 10, wherein said backing layer is made of thermoplastic elastomer having a hardness of 65 to 80.

14. The floor mat as recited in claim 13, wherein said main body is provided with 36 to 98 pieces of said slip-prevention members per 10 square centimeters (10 $cm^2$), wherein each of said plate-shaped base portions is set to have a thickness of 0.5 to 1.5 mm and a lower end surface area of 7 to 30 square millimeters ($mm^2$), wherein each of said leg portions is set to 0.7 to 1.55 mm in height and 0.7 to 1.55 mm in diameter, and wherein said plate-shaped base portion is provided with 2 to 8 separate leg portions.

15. The floor mat as recited in claim 10, wherein said main body is provided with 36 to 98 pieces of said slip-prevention members per 10 square centimeters (10 $cm^2$).

16. The floor mat as recited in claim 15, wherein each of said plate-shaped base portions is provided with 2 to 8 separate leg portions.

17. The floor mat as recited in claim 16, wherein each of said plate-shaped base portions is set to have a thickness of 0.5 to 1.5 mm and a lower end surface area of 7 to 30 square millimeters ($mm^2$), and wherein each of said leg portions is set to 0.7 to 1.5 mm in height and 0.7 to 1.5 mm in diameter.

18. The floor mat as recited in claim 10, wherein each of said plate-shaped base portions is set to have a thickness of 0.5 to 1.5 mm and a lower end surface area of 7 to 30 square millimeters ($mm^2$), and wherein each of said leg portions is set to 0.7 to 1.5 mm in height and 0.7 to 1.5 mm in diameter.

* * * * *